United States Patent
Pai et al.

(10) Patent No.: US 10,528,184 B2
(45) Date of Patent: Jan. 7, 2020

(54) TOUCH SIGNAL TRANSMISSION STRUCTURE OF TOUCH SENSOR FOR MAINTAINING SIGNAL CHANNEL ORDER IN EXTERNAL CONNECTIONS

(71) Applicants: Chih-Chiang Pai, Taoyuan (TW); Meng-Guei Lin, Taoyuan (TW); Chin-Fong Lin, Taoyuan (TW); Li-Yeh Yang, Taoyuan (TW); Chiu-Wen Chen, Taoyuan (TW)

(72) Inventors: Chih-Chiang Pai, Taoyuan (TW); Meng-Guei Lin, Taoyuan (TW); Chin-Fong Lin, Taoyuan (TW); Li-Yeh Yang, Taoyuan (TW); Chiu-Wen Chen, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 15/937,875

(22) Filed: Mar. 28, 2018

(65) Prior Publication Data
US 2019/0302912 A1    Oct. 3, 2019

(51) Int. Cl.
*G06F 3/041*   (2006.01)
*G06F 3/044*   (2006.01)

(52) U.S. Cl.
CPC ......... *G06F 3/04164* (2019.05); *G06F 3/041* (2013.01); *G06F 3/0443* (2019.05); *G06F 3/0448* (2019.05); *G06F 2203/04103* (2013.01)

(58) Field of Classification Search
CPC ........ G06F 3/041; G06F 3/044; G06F 3/0416; G06F 3/0412; G06F 3/047; G06F 2203/04103; G02F 1/1333; G02F 1/13338; G02F 1/13458; H01L 27/3276; H01L 24/06; H01L 2224/06155
See application file for complete search history.

(56) References Cited

U.S. PATENT DOCUMENTS

| | | | | |
|---|---|---|---|---|
| 2013/0081869 A1* | 4/2013 | Kim | ...................... | G06F 3/044 174/261 |
| 2013/0155002 A1* | 6/2013 | Yang | ...................... | G06F 3/044 345/174 |
| 2013/0300707 A1* | 11/2013 | Hershman | ............... | G06F 3/044 345/174 |
| 2014/0210784 A1* | 7/2014 | Gourevitch | .......... | H03K 17/962 345/174 |

(Continued)

*Primary Examiner* — Darlene M Ritchie (57) ABSTRACT

The invention includes a substrate, a touch sensor layer, an insulative film and a signal transmission layer. The touch sensor layer has sensing columns. Each sensing column has a first sensing electrode and second sensing electrodes. The first sensing electrode is connected to a first contact through a first transparent path. Each second sensing electrode is connected to a second contact through a second transparent path. The second contacts are arranged in the same order of the second sensing electrodes connected thereto. The insulative film covers the second contacts. The signal transmission layer has first signal wires, second signal wires and signal output terminals. Two end of each first signal wire are separately connected to the first contact and one of the signal output terminals. Each second signal wire connects the second contacts in a line and is connected to one of the signal output terminals.

5 Claims, 7 Drawing Sheets

(56) References Cited

U.S. PATENT DOCUMENTS

| | | | | |
|---|---|---|---|---|
| 2014/0320199 A1* | 10/2014 | Trend | ............... | G06F 3/044 |
| | | | | 327/517 |
| 2015/0170610 A1* | 6/2015 | Kurasawa | ............... | G09G 5/18 |
| | | | | 345/174 |
| 2015/0241906 A1* | 8/2015 | Tsai | ............... | G06F 3/044 |
| | | | | 345/173 |
| 2017/0123574 A1* | 5/2017 | Inagaki | ............... | G06F 3/0412 |
| 2017/0205928 A1* | 7/2017 | Noguchi | ............... | G06F 3/0412 |
| 2018/0046276 A1* | 2/2018 | Hou | ............... | G06F 3/0416 |

\* cited by examiner

TOUCH SIGNAL TRANSMISSION STRUCTURE OF TOUCH SENSOR FOR MAINTAINING SIGNAL CHANNEL ORDER IN EXTERNAL CONNECTIONS

BACKGROUND OF THE INVENTION

1. Technical Field

The invention relates to touch panel structures, particularly to an improved structure of touch signal transmission of touch panel.

2. Related Art

A touch sensor of a projected capacitive touch panel has a plurality of sensing columns. Each sensing column has a sensing electrode and driving electrodes. The sensing electrode and driving electrodes are connected to contacts through signal paths. The contacts are located a marginal portion of the touch panel and are connected with a flexible flat cable (FFC). As a result, signals from the touch sensor can be transmitted to a control unit. Such a touch panel has so many contacts, so a marginal portion of the touch panel must be widened or enlarged to accommodate these contacts and the FFC. However, this causes an excessively wide bezel of the touch panel. Such a bezel will impair appearance and enlarge an ineffective area.

Figure 4:
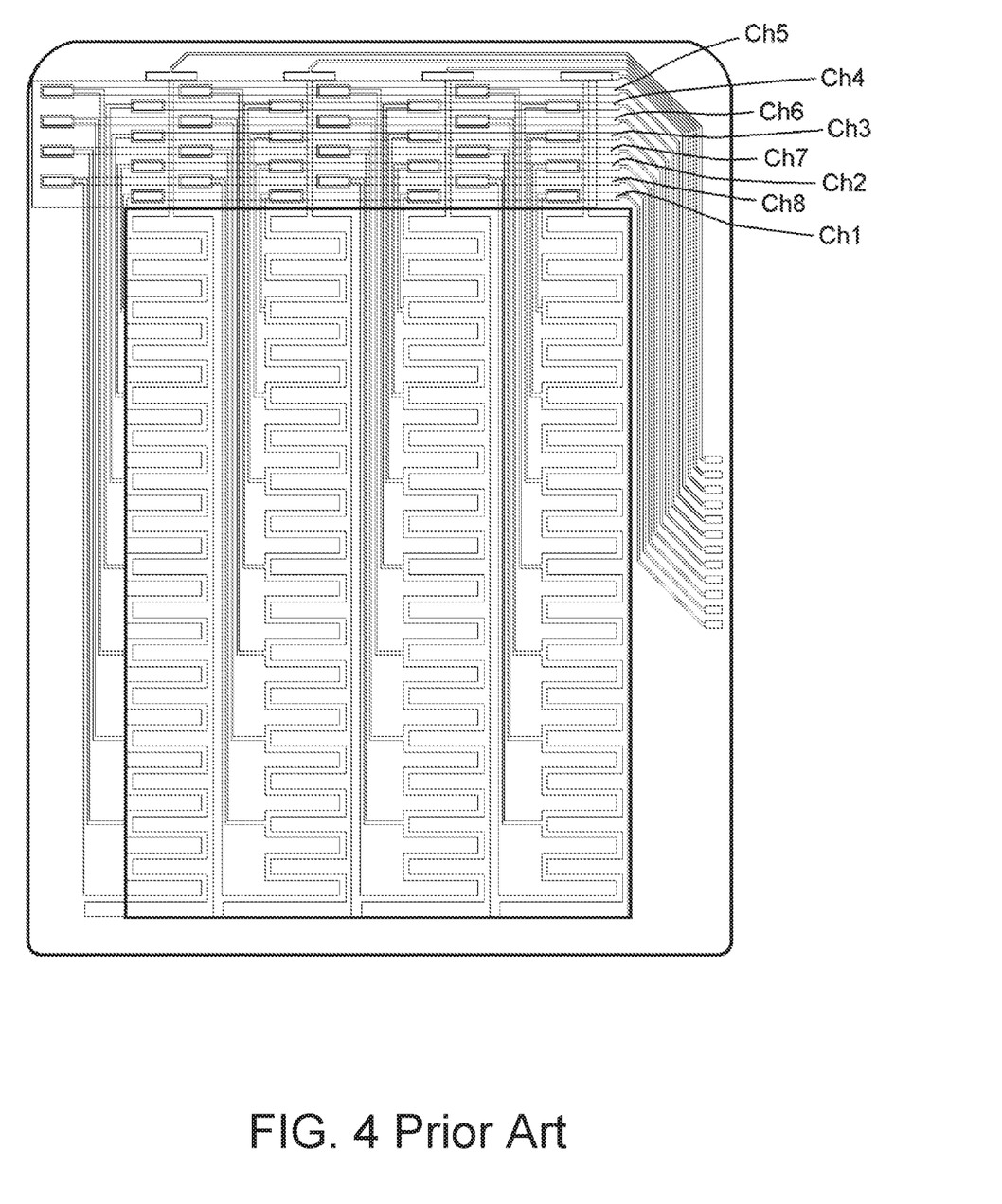
FIG. 4 is a plan view of a conventional touch sensor.

Please refer to FIG. 4, which shows a convention touch sensor. To reduce an area of a marginal portion of a touch panel, in this design, numerous contacts of driving electrodes of each sensing column are arranged at two sides of the signal paths. An insulative film is attached on the contacts and has through holes separately corresponding to the contacts. All contacts of the driving electrodes in a line of each sensing column are connected to form a signal channel by signal wires passing the through holes. As a result, the number of the contacts which are connected to an FFC can be decreased and a bezel width of touch panel can be narrowed.

Figure 5:
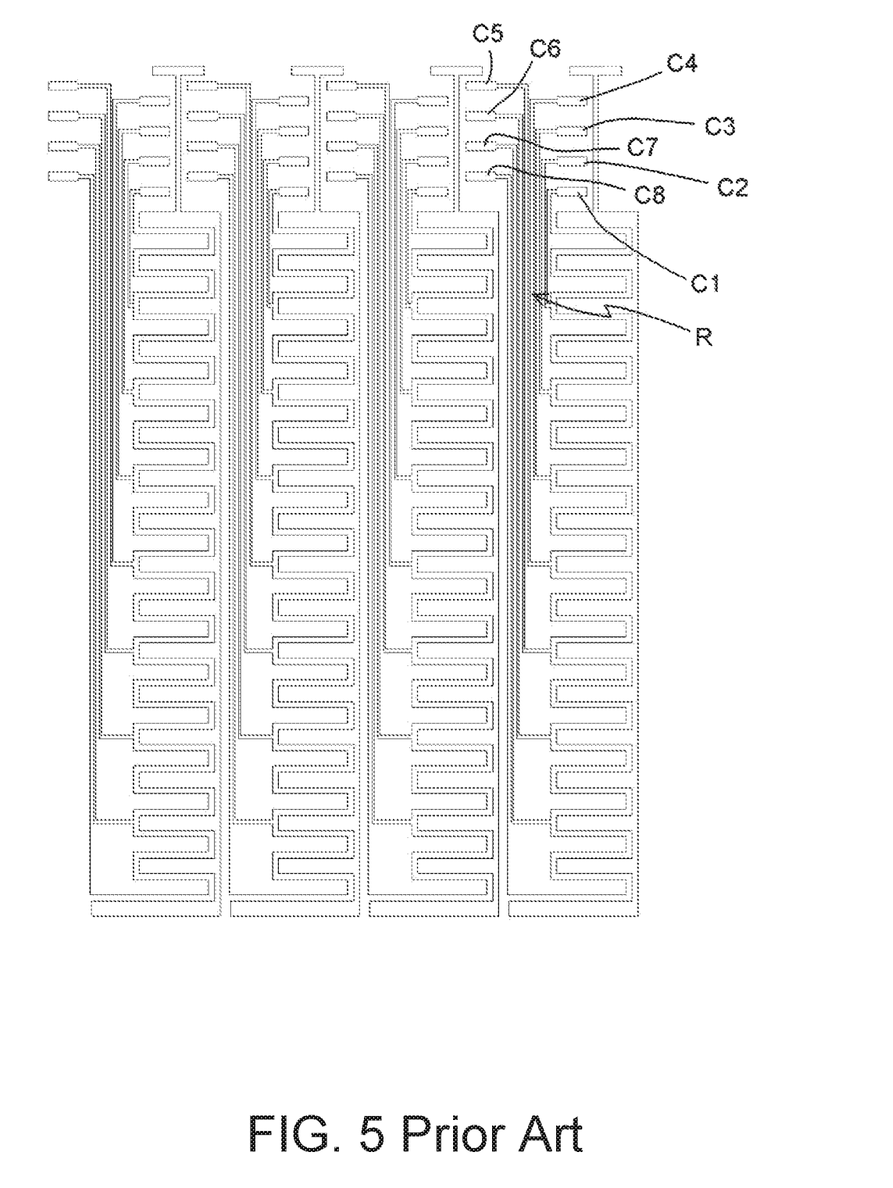
FIG. 5 is a plan view of sensing columns of a conventional touch sensor.
Figure 6:
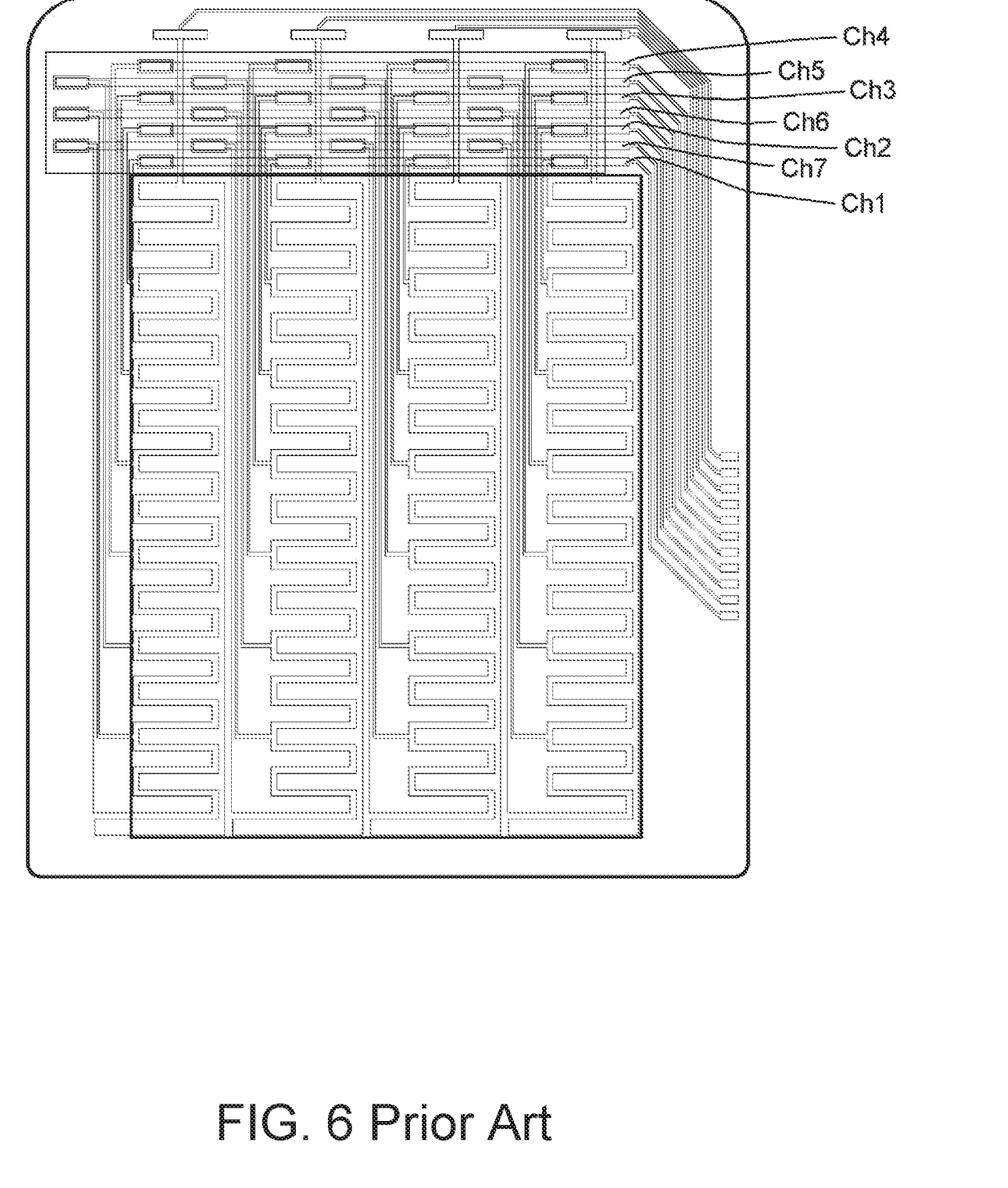
FIG. 6 is a plan view of another conventional touch sensor.
Figure 7:
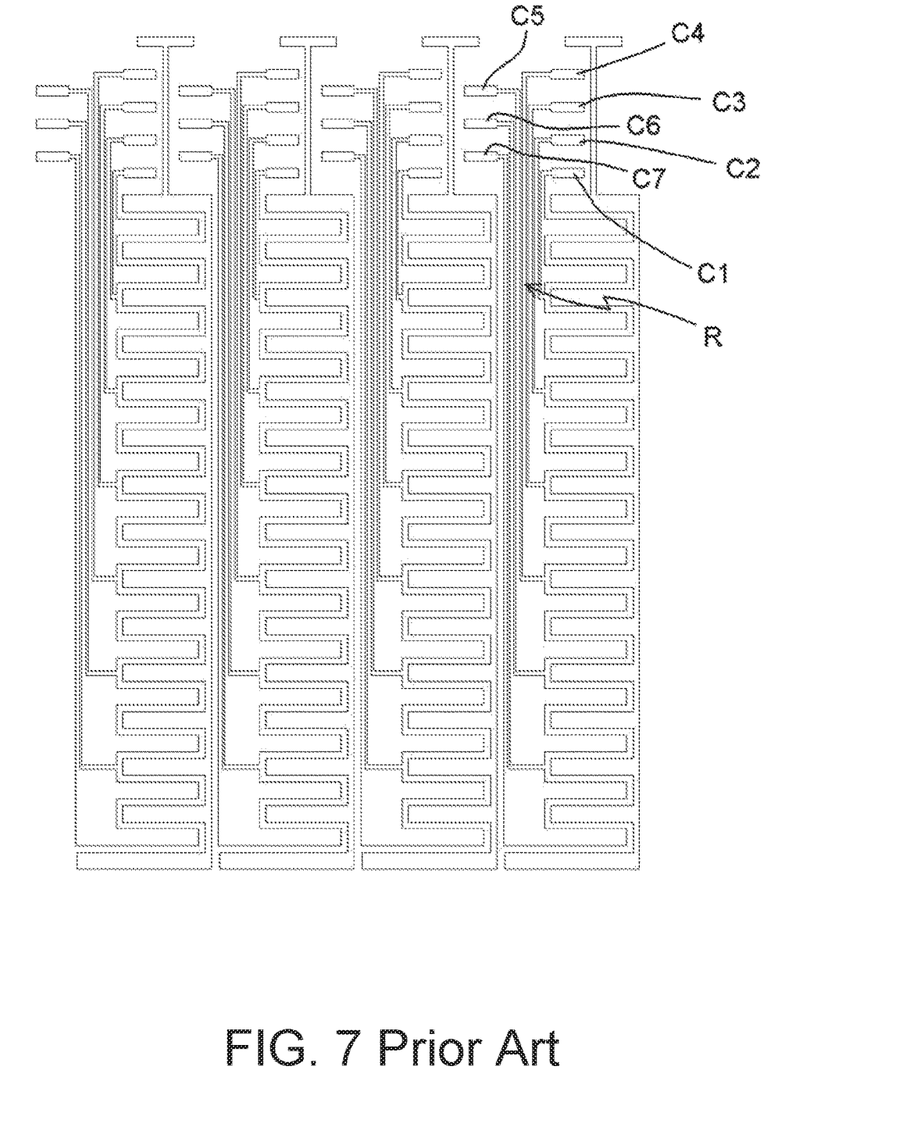
FIG. 7 is a plan view of sensing columns of another conventional touch sensor.

However, as shown in FIG. 5, contacts C1~C8 of driving electrodes of each sensing column are arranged at two sides of the signal paths R, and the signal channels formed by connecting signal wires are arranged non-sequentially. Accordingly, when the number of driving electrodes changes (for example, when a size of the touch panel is enlarged or decreased), the order of arrangement of the contacts of the driving electrodes will change. Correspondingly, the order of arrangement of the signal channels will change as well. For example, when a sensing column has 8 driving electrodes and 8 corresponding contacts C1~C8 (as shown in FIG. 5), its signal channels are arranged in the order of Ch5, Ch4, Ch6, Ch3, Ch7, Ch2, Ch8 and Ch1 (as shown in FIG. 4). When a sensing column has 7 driving electrodes and 7 contacts C1~C7 (as shown in FIG. 7), its signal channels are arranged in the order of Ch4, Ch5, Ch3, Ch6, Ch2, Ch7 and Ch1 (as shown in FIG. 6).

As a result, when the number of driving electrodes changes, the order of its signal channels will change significantly. However, because the signal channels must be finally connected a control center IC, when the order of arrangement of the signal channels, layout of signal wires and connections with the control center IC must be correspondingly modified. This really causes a serious problem to manufactures of touch panels.

SUMMARY OF THE INVENTION

An object of the invention is to provide a touch signal transmission structure of touch sensor, which makes driving electrodes of a sensing column and contacts be able to be correspondingly arranged in regular order and makes signal channels connecting the contacts be able to be arranged in fixed order. As a result, layout of signal wires can avoid repeatedly modifying depending on change of the number of driving electrodes or sensing columns.

To accomplish the above object, the touch signal transmission structure of touch sensor of the invention includes:

a transparent substrate, having a central visible area and a shaded area formed by an opaque bezel surrounding the visible area;

a transparent touch sensor layer, having sensing columns arranged in the visible area, each sensing column having a first sensing electrode and second sensing electrodes, the first sensing electrode being electrically connected to a first contact disposed in the shaded area through a first transparent path, each second sensing electrode being electrically connected to a second contact disposed in the shaded area through a second transparent path, wherein the second contacts are arranged in the same order of the second sensing electrodes connected thereto;

an insulative film, covering the second contacts, being provided with through holes separately corresponding to second contacts in position; and a signal transmission layer, having first signal wires, second signal wires and signal output terminals, located in the shaded area, an end of each first signal wire being connected to the first contact, another end thereof being connected to one of the signal output terminals, each second signal wire electrically connecting the second contacts in a line to form a signal channel and being connected to one of the signal output terminals.

DETAILED DESCRIPTION OF THE INVENTION

Figure 1:
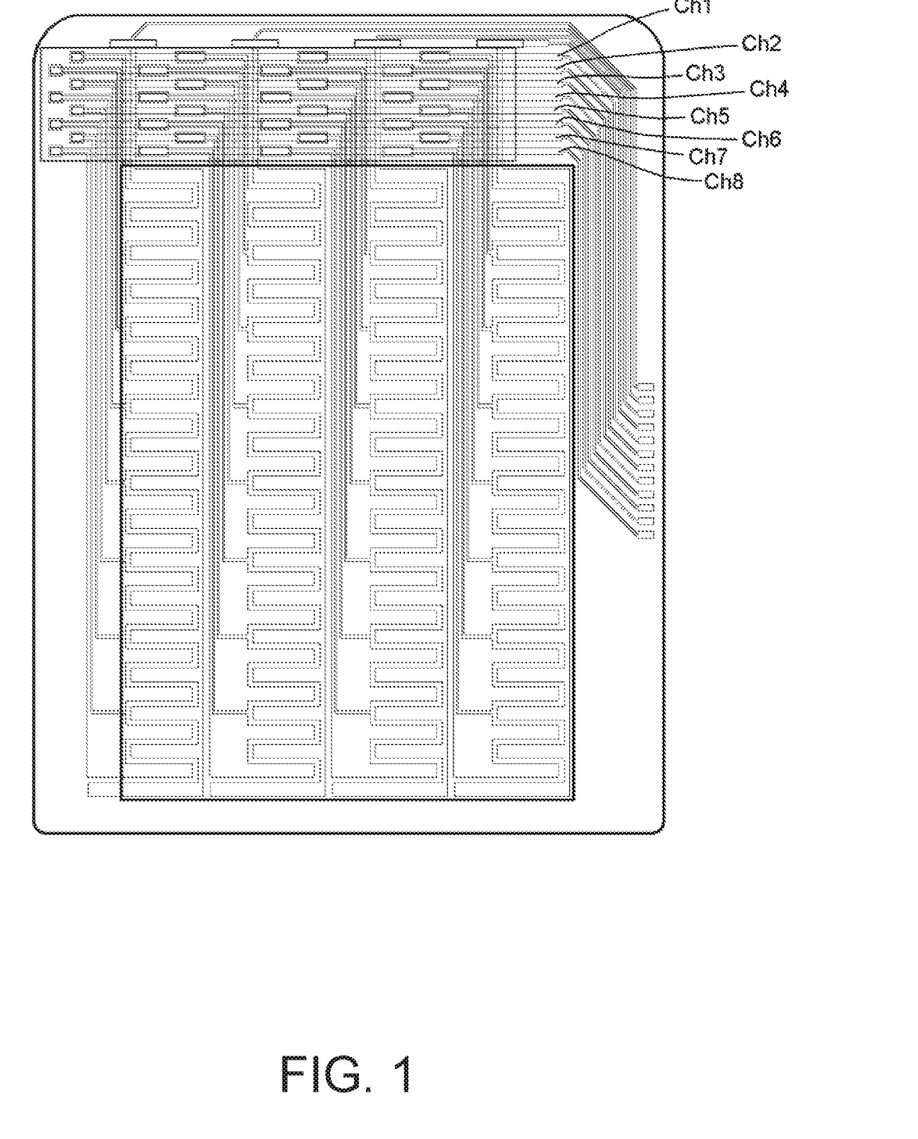
FIG. 1 is a plan view of the invention.
Figure 2:
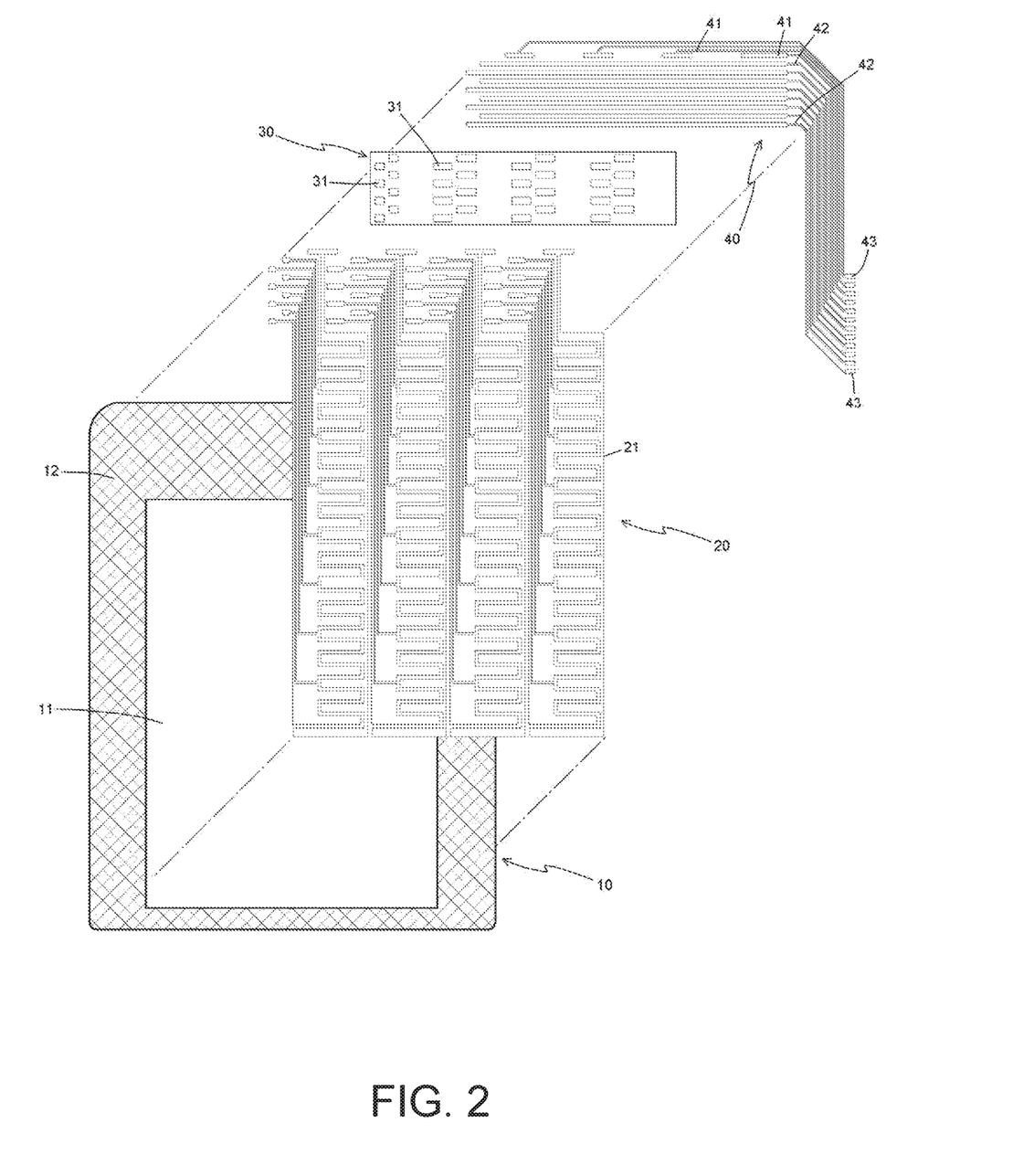
FIG. 2 is an exploded view of the invention.
Figure 3:
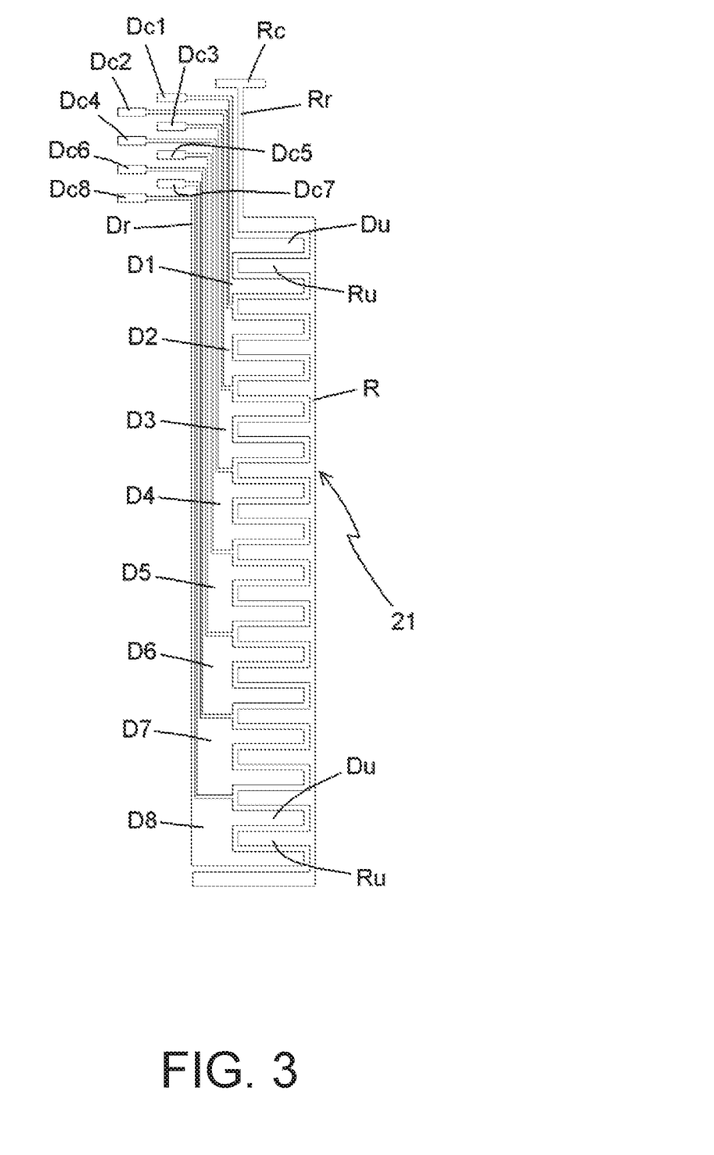
FIG. 3 is a plan view of the sensing column of the invention.

FIGS. 1-3 show a preferred embodiment of the invention. The invention provides a projected capacitive touch panel, which includes a transparent substrate 10, a transparent touch sensor layer 20, an insulative film 30 and a signal transmission layer 40. The substrate 1 may be, but not limited to, a thin plate with high transparency and great mechanical strength such as glass, poly(methyl methacrylate), or a transparent flexible film such as polyethylene terephthalate (PET) or polycarbonate (PC). A bezel is arranged on a periphery of the substrate 10 and is formed by an opaque insulative film which may be made of ink or photoresist. The bezel defines a hollow shaded area 12 and a visible area 11 within the shaded area 12 on the substrate 10.

The touch sensor layer 20 is made of a material with high transparency, such as an indium tin oxide, indium zinc oxide, aluminum zinc oxide or polyethylenedioxythiophene thin film. The touch sensing layer 20 includes a plurality of sensing columns 21 arranged in the visible area 11. As shown in FIG. 3, a single sensing column 21 is composed of one sensing electrode R and eight driving electrodes D1~D8. The sensing electrode R is of a comb shape. The sensing electrode R extends vertically and is provided with sensing conductor units Ru which are left horizontally arranged parallel. All the driving electrodes D1~D8 are of comb shapes and are provided with driving conductor units Du which are right horizontally arranged. The sensing electrode R and driving electrodes D1~D8 are arranged in a complementary pattern. The sensing conductor units Ru interlace with the driving conductor units Du but keep an isolated gap which is preferably between 20 μm and 600 μm to guarantee effective insulation between electrodes. In addition, the sensing electrode R is electrically connected to a contact Rc disposed in the shaded area 12 through a transparent path Rr. The driving electrodes D1~D8 are separately electrically connected to contacts Dc1~Dc8 disposed in the shaded area 12 through a transparent path Dr. The contacts Dc1~Dc8 are located at the left side of the transparent path Dr and are arranged in the same order of the driving electrodes D1~D8 connected thereto. That is, the order of arrangement of the driving electrodes is D1, D2, D3, D4, D5, D6, D7 and D8, and the order of arrangement of the contacts connected to the driving electrodes is Dc1, Dc2, Dc3, Dc4, Dc5, Dc6, Dc7 and Dc8.

The insulative film 30 covers the contacts Dc1~Dc8 of driving electrode D1~D8 of each sensing column 21 and is provided with through holes 31 separately corresponding to the contacts Dc1~Dc8 in position.

The signal transmission layer 40 is disposed within the shaded area 12 and includes sensing electrode signal wires 41, driving electrode signal wires 42 and signal output terminals 43. An end of each sensing electrode signal wire 41 is connected to one of the contacts Rc of the sensing electrodes R, and the other end thereof is connected to one of the signal output terminals 43. Each of the driving electrode signal wires 42 electrically connects the contacts in a line of the driving electrodes D1~D8 (e.g. the first contact Dc1 of each sensing column) to form a signal channel (e.g. the first signal channel). The driving electrode signal wires 42 orthogonally cross the transparent path Rr of the sensing electrode R of each sensing column 21 and are separately connected to ones of the signal output terminals 43. Similarly, the other contacts Dc2~Dc8 in one of lines can also be separately connected by other driving electrode signal wires 42 to form signal channels Ch2~Ch8, and the other end of each of these driving electrode signal wires 42 is individually connected to one of the signal output terminals 43. The signal output terminals 43 may be used for connecting a flexible flat cable (FFC) or a flexible printed circuit (FPC).

In sum, the contacts Dc1~Dc8 are arranged in the same order of the driving electrodes D1~D8 connected thereto, and the signal channels Ch1~Ch8 formed by the driving electrode signal wires 42 are also arranged in the same order. As a result, the order of arrangement of the signal channels can be fixed. Furthermore, because the order of arrangement of the contacts Dc1~Dc8 is fixed, the order of the signal channels Ch1~Ch8 in different lines can also be fixed. Therefore, when a touch panel size needs to be enlarged or the number of driving electrodes (i.e., contacts and signal channels) needs to be increased, adding one or more contacts and signal channels besides the original arrangement is just enough. The original arrangement does not need to be changed. Similarly, increasing the number of the sensing columns is identical. As a result, the invention can simplify design of touch signal transmission circuit.

Such alterations, modifications, and improvements are intended to be part of this disclosure, and are intended to be within the spirit and the scope of the present invention. Accordingly, the foregoing description is by way of example only and is not intended to be limiting. For example, the contacts Dc1~Dc8 of the abovementioned sensing column 21 are located on the same side as the transparent paths Dr, layout of the contacts may be horizontally varied, such as zigzag, S-shaped, Z-shaped or W-shaped. The present invention is limited only as defined in the following claims and the equivalents thereto.

What is claimed is:

1. A touch signal transmission structure of touch sensor, comprising:
   a transparent substrate, having a central visible area and a shaded area formed by an opaque bezel surrounding the visible area;
   a transparent touch sensor layer, having sensing columns arranged in the visible area, each sensing column having a first sensing electrode and second sensing electrodes, the first sensing electrode being electrically connected to a first contact disposed in the shaded area through a first transparent path, each second sensing electrode being electrically connected to a second contact disposed in the shaded area through a second transparent path, wherein the first contact is a terminal, each second transparent path is of an L shape, the second contacts of the sensing columns are located at the same side as the second transparent paths, and the second contacts are terminals arranged in the same both order and direction of the second sensing electrodes connected thereto;
   an insulative film, covering the second contacts, being provided with through holes separately corresponding to second contacts in position; and
   a signal transmission layer, having first signal wires, second signal wires and signal output terminals, located in the shaded area, an end of each first signal wire being connected to the first contact, another end thereof being connected to one of the signal output terminals, each second signal wire electrically connecting the second contacts in a line to form a signal channel and being connected to one of the signal output terminals.

2. The touch signal transmission structure of claim 1, wherein the second contacts is arranged in a zigzag shape, S shape, Z shape or W shape.

3. The touch signal transmission structure of claim 1, wherein the first signal wires and the signal output terminals are located at two different sides of the shaded area.

4. The touch signal transmission structure of claim 1, wherein all the second transparent paths are parallel with each other without an intersection.

5. The touch signal transmission structure of claim 1, wherein the first contact is located over the second contacts.

* * * * *